United States Patent
Jin et al.

(10) Patent No.: US 10,510,325 B2
(45) Date of Patent: Dec. 17, 2019

(54) RENDERING METHOD, RENDERING APPARATUS, AND ELECTRONIC APPARATUS

(71) Applicant: SAMSUNG ELECTRONICS CO., LTD., Suwon-si (KR)

(72) Inventors: Seunghun Jin, Suwon-si (KR); Kwontaek Kwon, Hwaseong-si (KR); Jeongae Park, Seoul (KR); Soojung Ryu, Hwaseong-si (KR); Yeongon Cho, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 440 days.

(21) Appl. No.: 14/819,193

(22) Filed: Aug. 5, 2015

(65) Prior Publication Data

US 2016/0125851 A1    May 5, 2016

(30) Foreign Application Priority Data

Oct. 31, 2014    (KR) .................. 10-2014-0150625

(51) Int. Cl.
*G09G 5/39* (2006.01)
*G09G 3/20* (2006.01)
*G06T 1/60* (2006.01)

(52) U.S. Cl.
CPC .............. *G09G 5/39* (2013.01); *G06T 1/60* (2013.01); *G09G 3/20* (2013.01); *G09G 2300/0452* (2013.01); *G09G 2340/06* (2013.01); *G09G 2370/042* (2013.01)

(58) Field of Classification Search
None
See application file for complete search history.

(56) References Cited

U.S. PATENT DOCUMENTS

| | | | |
|---|---|---|---|
| 7,583,279 B2 | 9/2009 | Brown Elliott et al. | |
| 2003/0011623 A1* | 1/2003 | Dermer | G06T 11/40 |
| | | | 345/635 |
| 2007/0205976 A1 | 9/2007 | Takatori et al. | |
| 2010/0128045 A1 | 5/2010 | Inamoto et al. | |
| 2011/0148892 A1 | 6/2011 | Shreiner et al. | |
| 2011/0148919 A1 | 6/2011 | Heggelund et al. | |

(Continued)

FOREIGN PATENT DOCUMENTS

| | | |
|---|---|---|
| EP | 1768099 A2 | 3/2007 |
| EP | 2672480 A1 | 12/2013 |

(Continued)

OTHER PUBLICATIONS

Extended European Search Report dated Dec. 9, 2015 in counterpart European Patent Application No. 15184302.6 (10 pages, in English).

(Continued)

Primary Examiner — Aaron M Richer
(74) Attorney, Agent, or Firm — Harness, Dickey & Pierce, P.L.C.

(57) ABSTRACT

A rendering method includes receiving an input including pixel pattern information of a device configured to display a rendered image, generating a pixel pattern of the rendered image using the received input indicating pixel pattern information, and outputting a pixel value of the rendered image into a frame buffer using the generated pixel pattern.

20 Claims, 11 Drawing Sheets

(56) References Cited

U.S. PATENT DOCUMENTS

| | | | | |
|---|---|---|---|---|
| 2011/0285746 A1* | 11/2011 | Swic | ..................... | G09G 5/02 |
| | | | | 345/597 |
| 2012/0092353 A1* | 4/2012 | Paltashev | ................. | G06T 9/00 |
| | | | | 345/522 |
| 2012/0257105 A1* | 10/2012 | Kimoto | ............. | H04N 21/4621 |
| | | | | 348/441 |
| 2012/0268480 A1 | 10/2012 | Cooksey et al. | | |
| 2013/0050203 A1* | 2/2013 | Matskewich et al. | ... | G09G 5/02 |
| | | | | 345/589 |
| 2013/0093784 A1* | 4/2013 | Budhiraja | .............. | G06T 5/002 |
| | | | | 345/611 |
| 2013/0222442 A1 | 8/2013 | Gu et al. | | |
| 2014/0267232 A1* | 9/2014 | Lum | ..................... | G06T 17/00 |
| | | | | 345/419 |
| 2015/0138488 A1* | 5/2015 | Shiomi | ............ | G02F 1/133603 |
| | | | | 349/69 |

FOREIGN PATENT DOCUMENTS

| | | |
|---|---|---|
| KR | 10-2008-0043996 A | 5/2008 |
| KR | 10-2011-0043873 A | 4/2011 |

OTHER PUBLICATIONS

Engelhardt, Thomas, et al. "Low-Cost Subpixel Rendering for Diverse Displays." *Computer Graphics Forum*. vol. 33. No. 1. 2014. (10 pages, in English).

European Search Report dated Mar. 9, 2017 for corresponding European Patent Application No. 15 184 302.6.

\* cited by examiner

RENDERING METHOD, RENDERING APPARATUS, AND ELECTRONIC APPARATUS

CROSS-REFERENCE TO RELATED APPLICATIONS

This application claims the benefit under 35 U.S.C. § 119(a) of Korean Patent Application No. 10-2014-0150625 filed on Oct. 31, 2014, in the Korean Intellectual Property Office, the entire disclosure of which is incorporated herein by reference for all purposes.

BACKGROUND

1. Field

The following description relates to a rendering method, a rendering apparatus, and an electronic apparatus.

2. Description of the Related Art

Three-dimensional graphics application program interface (API) standards include OpenGL, OpenGL ES, and Direct 3D. The API standards include methods of performing three-dimensional rendering with respect to each frame of an image and displaying images.

Rendering is divided into a geometry processing step and a pixel processing step. The geometry processing step refers to a process of dividing objects in a three-dimensional space into a plurality of primitives and the pixel processing step refers to a process of determining colors of the divided primitives.

When rendering is performed with respect to each frame of an image, many calculations are performed and power consumption increases. Thus, it is helpful to reduce the number of calculations and the number of memory access operations to minimize power consumption.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are rendering methods and apparatuses which minimize frame buffer access with respect to a rendered image since a graphic processing unit (GPU) outputs to a frame buffer only pixel information required by a display according to a pixel pattern of the display.

Also provided is a recording medium having embodied thereon a computer program for executing these methods.

Additional examples are set forth in part in the description which follows and, in part, are apparent from the description, or are potentially learned by practice of the presented examples.

In one general aspect, a rendering method includes receiving an input including pixel pattern information of a device configured to display a rendered image, generating a pixel pattern of the rendered image using the received input including pixel pattern information, and outputting a pixel value of the rendered image into a frame buffer using the generated pixel pattern.

The method may further include storing pixel values corresponding to at least one tile of the rendered image as pixel values corresponding to the generated pixel pattern, and outputting the pixel values corresponding to the generated pixel pattern into the frame buffer.

The generated pixel pattern may be based on a start coordinate value of the at least one tile.

The method may further include receiving an input including image property information indicating whether a frame corresponding to the rendered image is a frame for display on the device or a texture frame for rendering of another frame, wherein the generating of the pixel pattern of the rendered image is performed using the image property information.

In response to the rendered image being the texture frame for rendering of another frame, the pixel pattern may be used to restore an initial pixel pattern of the rendered image.

The method may further include outputting a bypass signal to a display controller of the device configured to display the rendered image.

The device configured to display the rendered image may be a PENTILE-based display device.

In another general aspect, a rendering method includes receiving at least one tile corresponding to an arbitrary frame rendered using tiles, converting a first pixel pattern corresponding to the at least one tile into a second pixel pattern corresponding to pixel pattern information of a display device configured to display the rendered arbitrary frame, and outputting a pixel value corresponding to the at least one tile according to the converted second pixel pattern into a frame buffer.

The method may further include storing pixel values corresponding to a tiles corresponding to the arbitrary frame using the converted second pixel pattern, wherein the pixel values stored corresponding to the converted second pixel pattern are output into the frame buffer.

The second pixel pattern may be generated using a start coordinate value of the at least one tile.

In response to the tiles being completely converted into the second pixel pattern, pixel values stored corresponding to the arbitrary frame may be output into the frame buffer.

In another general as non-transitory computer readable storage medium stores instructions for causing a processor to perform the above method.

In another general aspect, a rendering apparatus may include a rendering controller configured to receive an input including pixel pattern information of a device configured to display a rendered image, and a pixel pattern generator configured to generate a pixel pattern of the rendered image using the received input including pixel pattern information, wherein the rendering controller outputs a pixel value of the rendered image into a frame buffer using the pixel pattern generated by the pixel pattern generator.

The apparatus may further include a layout buffer configured to store pixel values corresponding to at least one tile of the rendered image as pixel values corresponding to the generated pixel pattern, wherein the rendering controller outputs the pixel values corresponding to the pixel pattern stored in the layout buffer into the frame buffer.

The generated pixel pattern may be based on a start coordinate value of the at least one tile.

The rendering controller may receive image property information indicating whether a frame corresponding to the rendered image is a frame for output to the device or a texture frame for rendering another frame, and the pixel pattern generator may generate the pixel pattern of the rendered image using the image property information.

In response to the rendered image being the texture frame for rendering of another frame, the rendering controller may use the pixel pattern to restore an initial pixel pattern of the rendered image.

The rendering controller may output a bypass signal to a display controller of the device configured to display the rendered image.

In another general aspect, an electronic device includes a host processor, a display device, a graphic processor configured to render a three-dimensional model of an object using a control of the host processor, and a frame buffer configured to store an image rendered by the graphic processor and to output the stored image using the display device, wherein the graphic processor receives, from the host processor, an input including pixel pattern information of the display device, generates a pixel pattern of the rendered image using the received input including pixel pattern information, and outputs a pixel value of the rendered image into the frame buffer using the generated pixel pattern.

The graphic processor may store pixel values corresponding to at least one tile of the rendered image as pixel values corresponding to the generated pixel pattern, and may output the stored pixel values into the frame buffer.

The host processor may determine image property information indicating whether a frame corresponding to the rendered image is a frame for output to the display device or a texture frame for rendering another frame in the graphic processor, and the graphic processor may generate the pixel pattern of the rendered image corresponding to the image property information received from the host processor.

In response to the rendered image being the texture frame for rendering of another frame, the graphic processor may use the pixel pattern to restore an initial pixel pattern of the rendered image.

The graphic processor may output a bypass signal to a display controller configured to control the display device.

The graphic processor may restore the initial pixel pattern of the rendered image using tile-based rendering.

The display device may be a PENTILE-based display device.

In another general aspect, a rendering apparatus includes a rendering controller configured to receive at least one tile corresponding to an arbitrary frame rendered using tiles, and a pixel pattern generator configured to convert a first pixel pattern corresponding to the at least one tile into a second pixel pattern corresponding to pixel pattern information of a display device configured to display the rendered arbitrary frame wherein the rendering controller outputs a pixel value corresponding to the at least one tile according to the converted second pixel pattern into a frame buffer.

The apparatus may further include a layout buffer configured to store pixel values corresponding to tiles corresponding to the arbitrary frame using the converted second pixel pattern, wherein the pixel values stored corresponding to the converted second pixel pattern are output into the frame buffer.

The second pixel pattern may be generated using a start coordinate value of the at least one tile.

In response to the tiles being completely converted into the second pixel pattern, pixel values stored corresponding to the arbitrary frame may be output into the frame buffer.

Other features and aspects will be apparent from the following detailed description, the drawings, and the claims.

Figure 1:
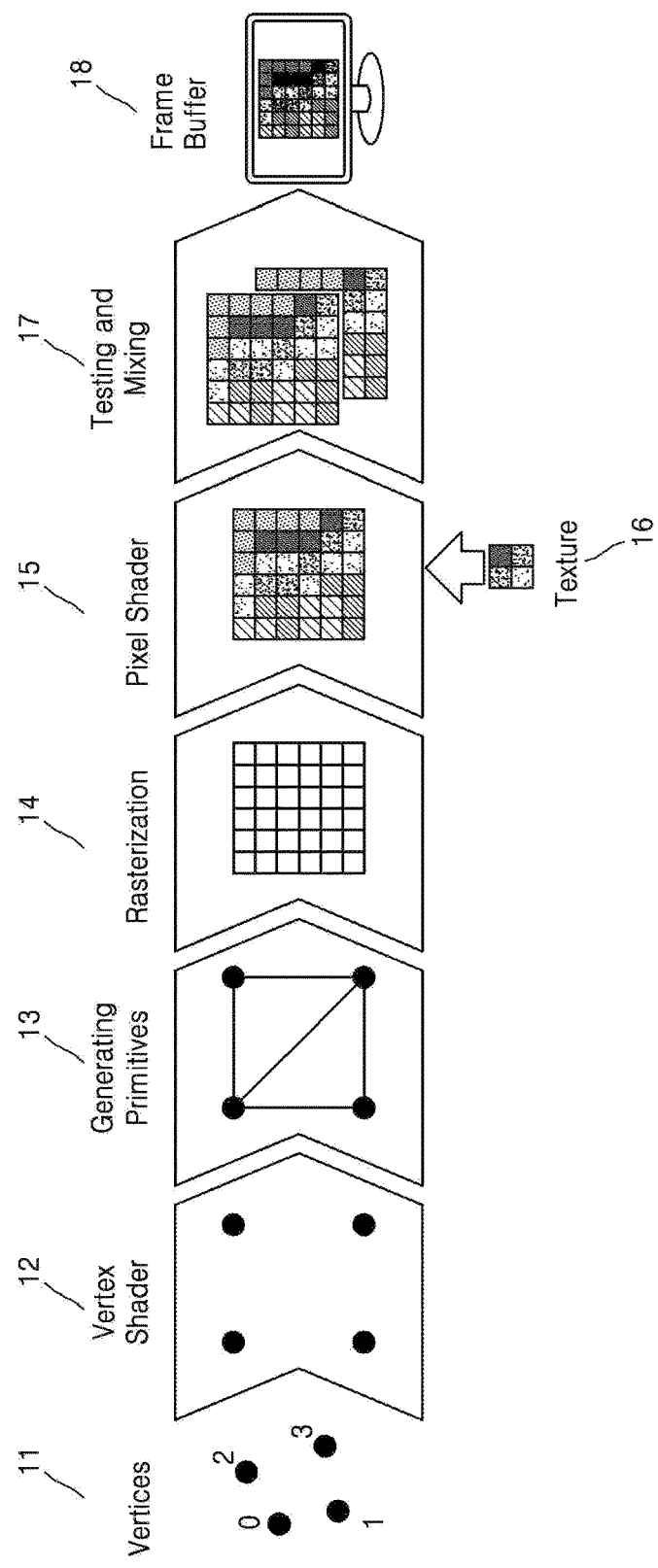
FIG. 1 is a view for describing a process of processing a three-dimensional image.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Reference is now made in detail to examples, some of which are illustrated in the accompanying drawings, wherein like reference numerals refer to like elements throughout. In this regard, the present examples potentially have different forms and are not intended to be construed as being limited to the descriptions set forth herein. Accordingly, the examples are merely described below, by referring to the figures, to explain aspects. As used herein, the term "and/or" includes any and all combinations of one or more of the associated listed items.

It is intended to be understood that, although the terms first, second, third etc. are used herein to describe various elements, components, regions, layers, and/or sections, these elements, components, regions, layers, and/or sections are not to be limited by these terms. These terms are only used to distinguish one element, component, region, layer, or section from another region, layer, or section.

As used herein, the singular forms "a," "an" and "the" are intended to include the plural forms as well, unless the context clearly indicates otherwise. It is to be further understood that the terms "comprises" and/or "comprising" as used herein specify the presence of stated features, integers, steps, operations, members, components, and/or groups thereof, but do not preclude the presence or addition of one or more other features, integers, steps, operations, members, components, and/or groups thereof. Expressions such as "at least one of," when preceding a list of elements, modify the entire list of elements and are not intended to modify the individual elements of the list.

Hereinafter, examples are described in detail, wherein like reference numerals refer to like elements and their descriptions are not repeated.

The present examples are related to three-dimensional (3D) graphics rendering. Such 3D graphics rendering is a process of mapping a 3D model onto a two-dimensional screen and calculating a value of a color which is to be drawn in each pixel of an actual two-dimensional screen. The 3D graphics rendering process is further described with reference to FIG. 1.

FIG. 1 is a view for describing a process of processing a three-dimensional (3D) image. Referring to FIG. 1, the process of processing the 3D image is illustrated in operations S11 through S17. Operations S11 through S13 correspond to a geometry processing step and operations S14 through S17 correspond to a pixel processing step.

Operation S11 refers to an operation of generating vertices indicating an image. The vertices are generated so as to indicate vertices corresponding to an object included in the image.

Operation S12 refers to an operation of shading the generated vertices. For example, a vertex shader designates a color of the vertices generated in Operation S11 and performs shading with respect to the generated vertices.

Operation S13 refers to an operation of generating primitives. For example, the primitives refer to one or more polygons formed by using dots, lines, or vertices. In an example, the primitives refer to triangles formed by connecting vertices. For example, the previously generated and shaded vertices are turned into primitives by connecting the vertices, thereby producing triangles.

Operation S14 refers to an operation of rasterizing. More specifically, the rasterizing is performed on the primitives. The rasterizing of the primitives refers to dividing the primitives into a plurality of fragments. The fragment is a unit that forms the primitive and is used as a base unit for performing image processing. The primitive includes only information with respect to vertices, such as coloration at vertices. Thus, in the process of rasterizing the primitive, interpolation is performed to generate fragments between vertices. In an example, a primitive includes fragments, and interpolation allows rasterizing to determine how to color the constituent pixels of the primitives that are not situated at the vertices.

Operation S15 refers to an operation of shading a pixel. Although FIG. 1 illustrates that shading is performed to correspond to a pixel unit, in another example, shading is performed to correspond to a fragment unit. For example, shading of the pixel or the fragment refers to designating a color of the pixel or the fragment to determine how it is to appear.

Operation S16 refers to an operation of texturing a pixel or a fragment, as a way to help determine the color of the pixel or fragment, when performing the shading. Texturing is a method that uses a pre-generated image to determine a color of the pixel or the fragment. For example, shading is performed by a calculation as to which color is to be designated in the fragment, but texturing is a method that designates the color of the fragment corresponding to the pre-generated image as the color of the pre-generated image. Thus, texturing is used to take a pre-generated two-dimensional image and map it onto a three-dimensional surface.

In the case of operation S15 or S16, since shading or texturing has to be performed with respect to each pixel or each fragment, many calculations are used as part of shading or texturing. Therefore, it is advantageous to reduce calculations by performing the process of shading or texturing more efficiently, so that shading or texturing is successful, but less resource-intensive. One method for reducing the calculations used in shading or texturing in the process of shading is a hidden surface removal (HSR) method. The HSR method is a method in which shading is not performed with respect to an object which is hidden by an object located in front of the object. Since such a hidden surface is occluded, it will not have any role in the final image, and hence ignoring such a hidden surface avoids certain calculations without a detrimental effect of the final image.

Operation S17 refers to an operation of testing and mixing. In such an operation, the output of the preceding steps are accumulated and processed so as to prepare a final, rendered frame.

Operation S18 refers to an operation of displaying a frame stored in a frame buffer. The frame generated by operations S11 through S17 is stored in the frame buffer. The frame stored in the frame buffer is displayed via a display device. Such a display device accesses the frame, which includes a matrix of color values associated with each pixel of the frame and produces a visual rendition of the colors generated for each pixel during operations S11 through S17.

Figure 2:
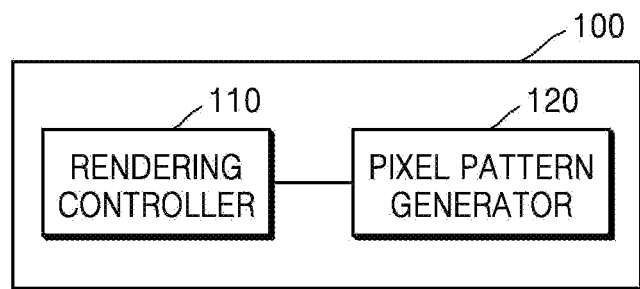
FIG. 2 is a view for describing a rendering apparatus according to an example.

FIG. 2 is a view for describing a rendering apparatus 100 according to an example.

Referring to the example of FIG. 2, the rendering apparatus 100 includes a rendering controller 110 and a pixel pattern generator 120. Although not illustrated in FIG. 2, the rendering apparatus 100 also includes a graphics pipeline for performing operations S11 through S17 illustrated in FIG. 1. The rendering controller 110 controls image processing through such a graphics pipeline. As discussed above, such a graphics pipeline uses a progression of steps to generate images.

Also, the rendering apparatus 100 identifies pixel pattern information of a display device via which a rendered image is to be displayed. Based on the pixel pattern information, the rendering apparatus 100 generates a pixel pattern of the rendered image, in correspondence to the pixel pattern information of the display device, before outputting the rendered image in a frame buffer. As provided in S18 of FIG. 1, when the information is outputted in a frame buffer, it allows each rendered frame to be visually displayed. In other words, values of Red/Green/Blue (R/G/B) intensity that correspond to sub-pixels of all pixels of the rendered image are not output in the frame buffer 18. Thus, the pixel pattern of the rendered image, corresponding to a sub-pixel realized in the display device, that is, for example, a pixel pattern formed of sub-pixels of Red/Green (R/G) and Blue/Green (B/G) or a pixel pattern formed of sub-pixels of Red/Green (R/G) and Blue/White (BAN), is formed.

The rendering controller 110 controls an operation of the rendering apparatus 100 and receives an input of pixel pattern information of the display device via which the rendered image is to be displayed.

The pixel pattern generator 120 generates the pixel pattern of the rendered image in correspondence to the pixel pattern information provided from the rendering controller 110. For example, when a pixel pattern of the rendered image is R/G/B, and a pixel pattern of the display device is R/G and B/G, the pixel pattern generator 120 converts the sub-pixels R/G/B of a first pixel of the rendered image into the sub-pixel R/G and converts the sub-pixels R/G/B of a second pixel of the rendered image into the sub-pixel B/G. However, when the pixel pattern of the display device is R/G and BAN, the pixel pattern generator 120 converts the sub-pixels R/G/B of the first pixel of the rendered image into the sub-pixel R/G and converts the sub-pixels R/G/B of the second pixel into the sub-pixel B/W. Here, a method of generating the sub-pixel White (W) may include generating a pixel value of the sub-pixel W by combining pixel values of the sub-pixels R/G/B because a White sub-pixel is based on a combination of Red/Green/Blue intensities or generating the pixel value of the sub-pixel W by considering pixel values of adjacent sub-pixels. Alternatively, a method of converting the sub-pixels may include discarding the sub-pixel Blue(B) in the first pixel to generate the sub-pixel R/G, or generating the sub-pixel R/G by considering a pixel pattern of adjacent pixels.

The rendering controller 110 outputs the pixel pattern generated by the pixel pattern generator 120 in the frame buffer. Again, with respect to the operation of the frame buffer, refer to S18 of FIG. 1.

According to the rendering apparatus 100, according to the present example, since not all pixels in a screen of an actual, physical display device are drawn by using every color element of a rendered image, an amount of data that is to be output in memory is potentially reduced by generating and outputting pixel data actually to be used by the display device. Also, a quantity of data is smaller compared with data that would be necessary for actual full RGB pixel data when transferring the data to off-chip memory, that is, the frame buffer, and hence traffic is also potentially reduced. In addition, since a predetermined amount of calculation or memory access operations are reduced according to a characteristic of the display itself regardless of a previous frame, performance improvement is also realized.

Figure 3:
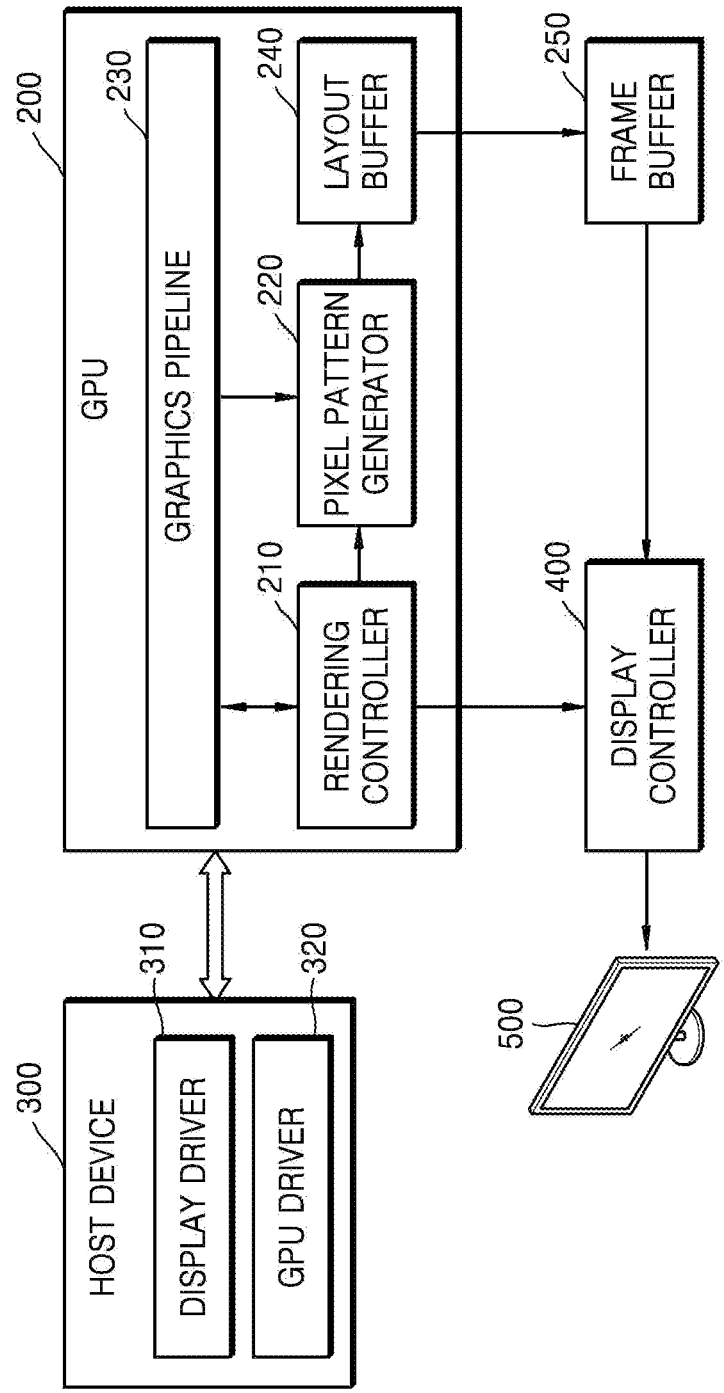
FIG. 3 is a view for describing an electronic apparatus according to another example.

FIG. 3 is a view of an electronic device according to another example.

Referring to the example of FIG. 3, the electronic device includes a Graphics Processing Unit (GPU) 200, a frame buffer 250, a host device 300, a display controller 400, and a display device 500. The electronic device is an application device that uses three-dimensional (3D) graphics rendering. Examples of the electronic device include cellular phones, smart phones, tablets, and TVs. However, the electronic device is not limited thereto, and other electronic devices that use 3D graphics rendering are used in other examples.

A GPU driver 320 of the host device 300 receives data and calls regarding 3D graphics rendering from an application program via a graphics Application Program Interface (API), and so forth. A rendering controller 210 of the GPU 200 receives the calls from the GPU driver 320, schedules the calls for execution, and drives a graphics pipeline based on the scheduled calls. The graphics pipeline performs actual 3D graphics rendering by executing the calls received from the host device 300 and a data/shader program that is transferred from the GPU driver 320. In the case of tile-based rendering, rendering is processed at a level of each tile and the tile which is rendered is sent to an off-chip memory. When all tiles are rendered, one frame is completed in off-chip memory as a set of tiles that include rendered results. Thus, when the frame is output via a display driver 310 or a display controller 400 as discussed above, the rendered image is displayed on the screen of the display device 500. That is, the display device 500 uses the information included in the rendered image and presents it visually.

As described with reference to FIG. 1, the 3D graphics rendering includes reading geometric information and rendering the information into a corresponding two-dimensional (2D) image. Memory access operations are inherently generated in the process of reading geometric information or writing a result of rendering, because such operations include using the memory as a source or destination of such information. In general, such memory access tends to occur in the 3D graphics processing to excess, consuming large quantities of system resources. Such a large consumption of system resources degrades both power and performance characteristics. Thus, in a mobile environment, the tile-based rendering is used. According to the tile-based rendering, a screen is divided into a number of tiles, and after rendering is performed with respect to each of the tiles, the rendered tiles are output on the screen if all tiles are rendered to form a complete picture. Each tile is processed on on-chip memory when it is being generated, and is sent to off-chip memory after all calculations are completed. Thus, off-chip memory access is greatly reduced because the tiles are not sent until they are actually ready. Furthermore, as part of this process, if the content of the tile to be sent to the off-chip memory is the same as that of the tile located in the same place in a previous frame, overwriting is not necessary. As a result, traffic from the on-chip memory to the off-chip memory may be further decreased, because the resource consumption that would otherwise be used for such unnecessary overwrites is also avoided.

Such tile-based rendering minimizes off-chip memory access in a rendering process by avoiding redundant and unnecessary memory access operations. For example, when the content of a tile is changed from a previous frame, all values of rendered tiles are written in off-chip memory. Thus, when there is no value that is changed from the previous frame, memory access is greatly reduced. However, when it is the differing case that many tiles are changed, reduction of memory access is likely not to be expected. Also, although all such values are usually required to display a screen image, in the case where not all of the values associated with an image to be displayed are used according to a characteristic of a display device, unnecessary off-chip memory writing potentially occurs.

According to the electronic device according to an example, since not all pixels of the rendered image are drawn by using every color element, only pixel data actually necessary for successful operation of the display device is generated and output. Accordingly, since certain types of monitors can successfully display image while only using a subset of information associated with an image, as discussed above, an amount of data that is to be output in memory is reduced and traffic transferred to off-chip memory is decreased. Also, a predetermined amount of calculations or memory access is reduced according to a characteristic of the display regardless of a previous frame, and thus, performance improvement is realized. As noted, such a performance improvement stems from the nature of such display devices, because they are able to successfully display images without requiring all of the RGB image data required by other such display devices.

Referring again to FIG. 3, the host device 300 receives calls and related data regarding rendering from a user application via the 3D graphics API, and so on, and drives the GPU 200 based on the received calls and related data.

The GPU 200 is controlled by the rendering controller 210, and the rendering controller 210 directly processes the calls and related data received from the GPU driver 320 or transfers the calls and related data to the graphics pipeline 230. Source data, for example, a 3D object, goes through a process of transformation and shading by passing through the graphics pipeline 230, and is drawn by being mapped in each pixel of the 2D frame buffer 250. Such mapping determines how a pixel in the 2D frame should be colored so as to best represent the 3D object. The frame buffer 250 is transferred to the display driver 310 or the display controller 400 and a corresponding image is then displayed in the display device 500.

The rendering controller 210 receives an input of pixel pattern information of the display device 500 from the host device 300. For example, the GPU driver 320 of the host device 300 identifies a display characteristic, for example, an R/G/B pattern, and a color element pattern with respect to each pixel coordinate, of the display device 500 currently used. For example, the GPU driver 320 identifies the display characteristic through the display driver 310 or a controller, not shown, of the host device 300. Also, since patterns R/G and B/G are alternately arranged in a row direction, a pixel pattern of a specific coordinate of a 2D screen is also identified, if one pixel pattern of a screen location is stored.

FIGS. 4A through 4D are example views of pixel patterns of the display device 500.

Figure 4A:
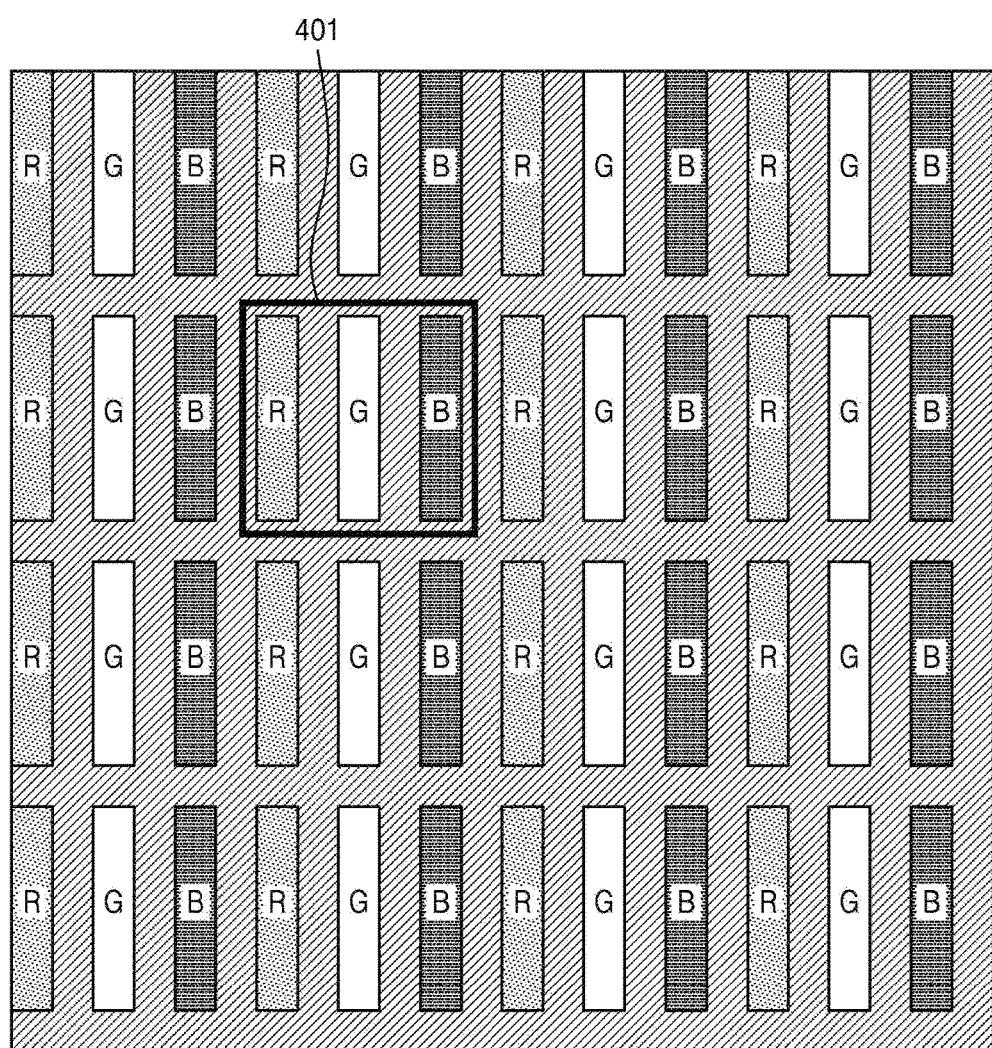
FIGS. 4A through 4D are example views of a pixel pattern of a display device.

FIG. 4A illustrates an R/G/B pattern of a typical LCD display. Each R/G/B group forms one pixel 401, and multiple such pixels exist in a number according to a resolution of the screen.

Figure 4B:
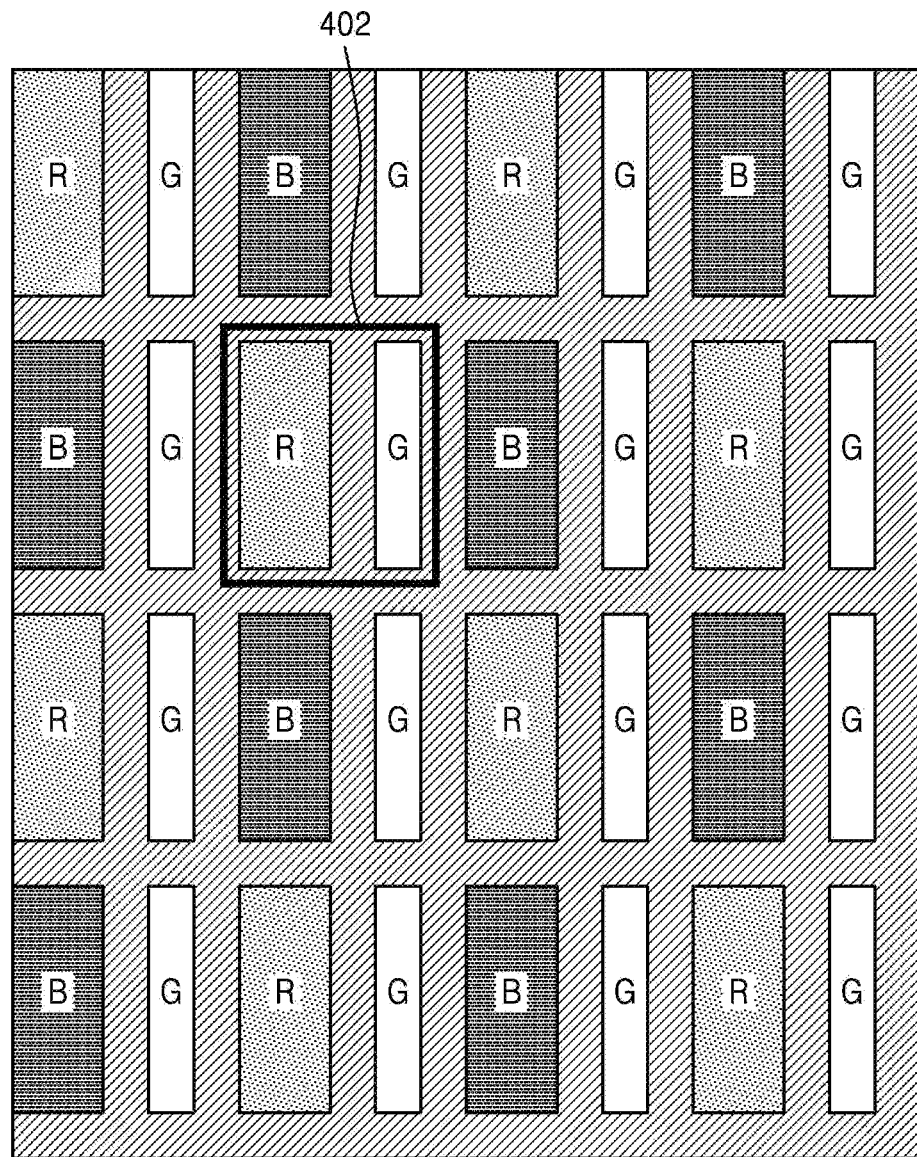

An alternative is illustrated in FIG. 4B, such that that R and G form one R/G pixel 402, and B and G form one B/G pixel, and these groups are alternately arranged. The number of pixels illustrated in FIG. 4B is 4×4 that is equal to 16 total, and is the same as the total number of pixels illustrated in FIG. 4A, which is also 16. Thus, the pixel pattern illustrated in FIG. 4B has the same number of pixels as the pixel pattern illustrated in FIG. 4A. However, the pixel pattern illustrated in FIG. 4B provides the same number of pixels by using a smaller number of sub-pixels.

Figure 4C:
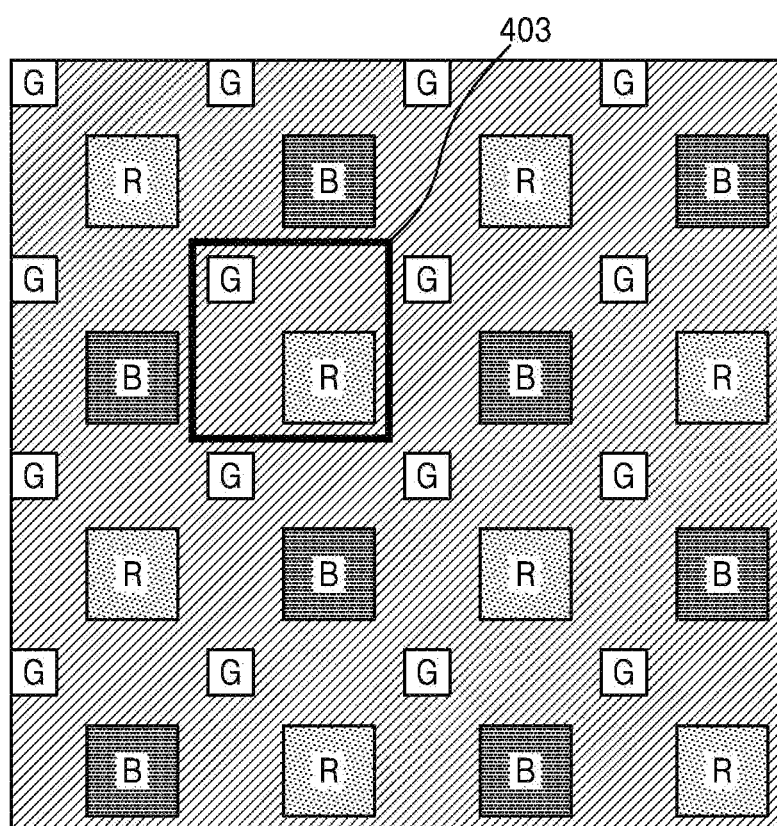

As in FIG. 4B, it is illustrated in FIG. 4C that R and G form one R/G pixel 403, and B and G form one B/G pixel, and the pixels are alternately arranged. However, FIG. 4C differs from FIG. 4B in that one pixel is arranged in a diamond shape.

Figure 4D:
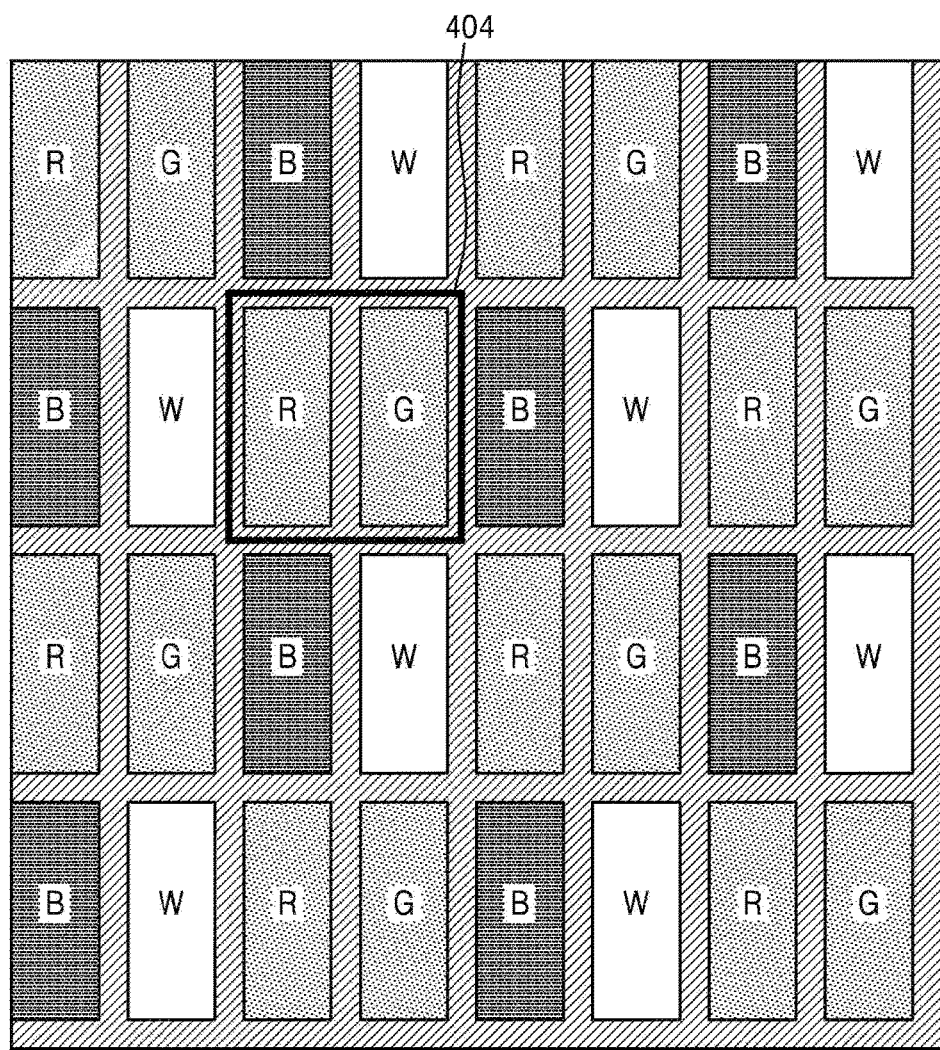

Additionally, it is illustrated in FIG. 4D that R and G form one R/G pixel 404, and B and W form one B/W pixel, and the pixels are alternately arranged. The number of pixels illustrated in FIG. 4D is 4×4 is equal to 16 total, and is the same as the number of pixels illustrated in FIGS. 4A through 4C, where each of FIGS. 4A through 4C also illustrates 16 pixels. The sub-pixel W of the pixel pattern illustrated in FIG. 4D is generated by combining the R/G/B pixels or by using pixel values of adjacent pixels, appropriately.

Thus, the pixel patterns illustrated in FIGS. 4B and 4C are used when it is hard to increase the number of pixels per inch (PPI) by using the RGB sub-pixel method illustrated in FIG. 4A. Almost the same resolution is obtained by using the pixel patterns illustrated in FIGS. 4B and 4C, even though a smaller number of sub-pixels than in the RGB sub-pixel method is used. Nevertheless, the number of sub-pixels used in this case is smaller than that used in the RGB sub-pixel method. Thus, it is potentially hard to display by the same level of resolution, and also, readability and image quality potentially decrease. However, the pixel patterns illustrated in FIGS. 4B and 4C are appropriate for use in a high-resolution panel. Thus, the pixel patterns are mainly used in such a high-resolution panel, examples of which include a TFT-LCD or an OLED. The pixel patterns illustrated in FIGS. 4B and 4C are divided into an RG/BG PENTILE sub-pixel method illustrated in FIGS. 4B and 4C and an RG/BW PENTILE sub-pixel method illustrated in FIG. 4D. Such pixel patterns are referred to as a PENTILE display or a PENTILE pattern. More specifically, the pixel patterns illustrated in FIGS. 4B and 4C are often used in an OLED panel and the pixel pattern illustrated in FIG. 4D is often used in a TFT-LCD panel.

In the present example, the pixel patterns of the display device 500 illustrated in the examples of FIGS. 4B and 4C are described. However, the display device is not limited thereto, and there may be a variety of display devices using pixel patterns of rendered images. Other examples also include other pixel patterns different from the pixel pattern realized as the RGB. Thus, examples apply in the context of those display devices that use other pixel patterns.

The rendering controller 210 provides pixel pattern information of the display device 500 to the pixel pattern generator 220. The pixel pattern generator 220 receives a rendered image through the graphics pipeline 230 and generates a pixel pattern of the rendered image corresponding to the pixel pattern information of the display device 500.

The pixel pattern generator 220 generates the pixel pattern of the rendered image to correspond to the pixel pattern of the display device 500. Here, to generate the pixel pattern denotes to convert or re-arrange the pixel pattern.

The pixel pattern generator 220 generates sub-pixels corresponding to the pixel pattern of the display device 500 by using various technologies for generating sub-pixels. For example, certain technologies provide a method of generating a PENTILE pixel. A process in which the pixel pattern generator 220 generates sub-pixels is described further later with reference to FIGS. 5 through 7.

The rendering controller 210 receives an input of image property information. The image property information indicates whether the rendered image output via the graphics pipeline 230 is a frame that is to be output in the display device 500 or a texture frame that is to be used in rendering of another frame through the graphics pipeline 230. The pixel pattern generator 210 generates the pixel pattern of the rendered image, based on the pixel pattern of the rendered image, according to the image property information received from the rendering controller 210.

For example, the GPU driver 320 of the host device 300 directly processes the graphics API that is included in a user program. Thus, in such an example, the GPU driver 320 identifies in which form a draw call is used, where a draw call is a request that a certain graphical object be drawn. One or more of such draw calls are used to draw one frame. In some examples, the drawn frame is directly output in a screen, is used as a texture of another frame, or is used in post-processing. Hence, the application of the frame is not limited. However, in general, it is predicted as to how each frame is to be used, by using calculations of the GPU driver 320. Also, when an API extension is considered, the purpose of use of each frame may be explicitly designated as part of the definitions provided by the API. Thus, the rendering controller 210 receives an input of image property information and provides information regarding whether the pixel pattern generator 220 is to generate a pixel pattern corresponding to the pixel pattern information of the display device 500.

For example, when the rendered image provided through the graphics pipeline 230 is an image which is to be output in the display device 500, the pixel pattern generator 220 generates sub-pixel values by changing a pixel pattern in order to correspond to the pixel pattern information of the display device 500. Also, when the rendered image provided through the graphics pipeline 230 is a texture image which is to be used in rendering of another image, the pixel pattern is not newly generated and is directly output. Alternatively when the pixel pattern is changed, a sub-pixel of the original RBG pattern is reversely generated by using the corresponding pixel pattern information.

In such an example, the rendering controller 210 stores the pixel pattern generated by the pixel pattern generator 220 in a layout buffer 240 that is on-chip memory. Such storage occurs before outputting the pixel pattern in the frame buffer 250 that is off-chip memory. Thus, when it is time to output in the frame buffer 250 pixel values of the rendered image which are stored in the layout buffer 240, the stored pixel values are output into the frame buffer 250.

When the pixel pattern generator 220 generates the pixel pattern of the rendered image, corresponding to the pixel pattern information of the display device 500, the rendering controller 210 outputs a bypass signal in the display controller 400. The display controller 400, which received the bypass signal, directly outputs pixel values output from the frame buffer 250 into the display device 500, without converting the pixel value patterns. Thus, the display controller 400 directly displays the image output from the frame buffer 250, without considering a characteristic of the display device 500, such as a particular pixel arrangement as discussed further above.

When the rendering according to an example is tile-based rendering, one frame is divided into a number of tiles, and after rendering is performed with respect to each of the tiles, the rendered tiles are output on the screen if all tiles are rendered. Each tile is processed on on-chip memory or a tile buffer, not shown, in the GPU 200, and is sent to off-chip memory, that is, the frame buffer 250, after all calculations are completed, and thus, off-chip memory access is reduced.

The pixel pattern generator 220 generates a pixel pattern with respect to one of a plurality of tiles included in one frame.

The rendering controller 210 stores pixel values with respect to one tile in the layout buffer 240 based on a pixel pattern generated with respect to the tile. Unlike other tile-based rendering approaches, when it is time to write a rendered tile in the frame buffer 250 for the output on the screen, the tile is not instantly written. Instead, the tile is first stored in the layout buffer 240. When pixel values corresponding to the pixel pattern of the display device 500, with respect to all tiles, are stored in the layout buffer 240, only then the pixel values are output in the frame buffer 250.

Figure 5:
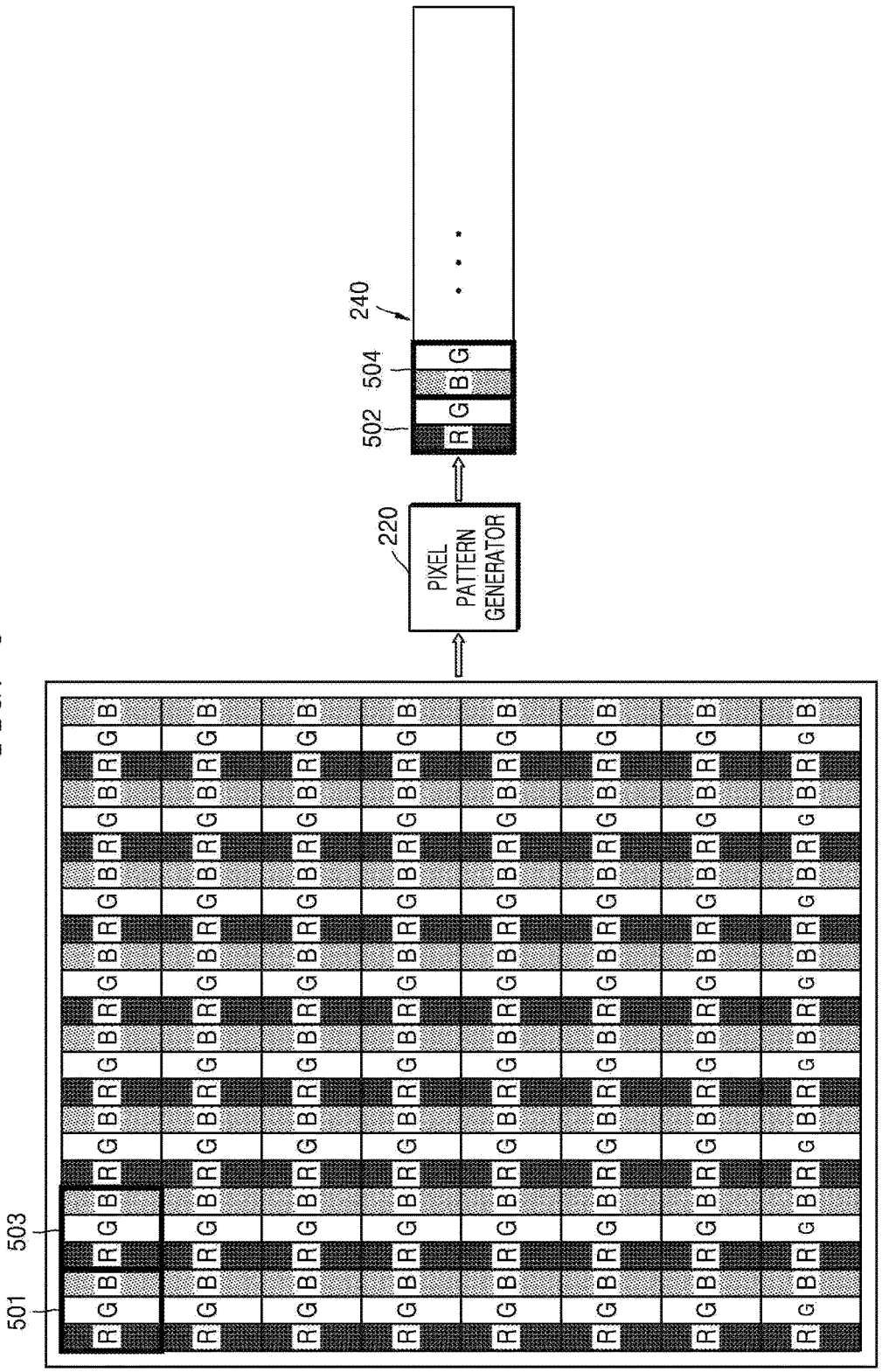
FIG. 5 is a view for illustrating a process of generating a pixel pattern via a pixel pattern generator of FIG. 3, according to an example.

FIG. 5 is a view for illustrating an example of the pixel pattern generator 220 of FIG. 3 generating a pixel pattern.

Referring to FIG. 5, one frame of a rendered image is illustrated as pixels 501 and 503 formed of RGB sub-pixels. When the display device 500 has the R/G and B/G patterns as illustrated in FIG. 4B, the pixel pattern generator 220 converts the first pixel 501 of the rendered image into a sub-pixel 502. The second pixel 503 is converted into a sub-pixel 504. The pixel patterns in which converted sub-pixels R/G and B/G are repeated are stored in the layout buffer 240. When a final pixel of the rendered image is converted into the sub-pixel B/G and stored in the layout buffer 240, pixel values stored in the layout buffer 240 are output into the frame buffer 250.

Figure 6:
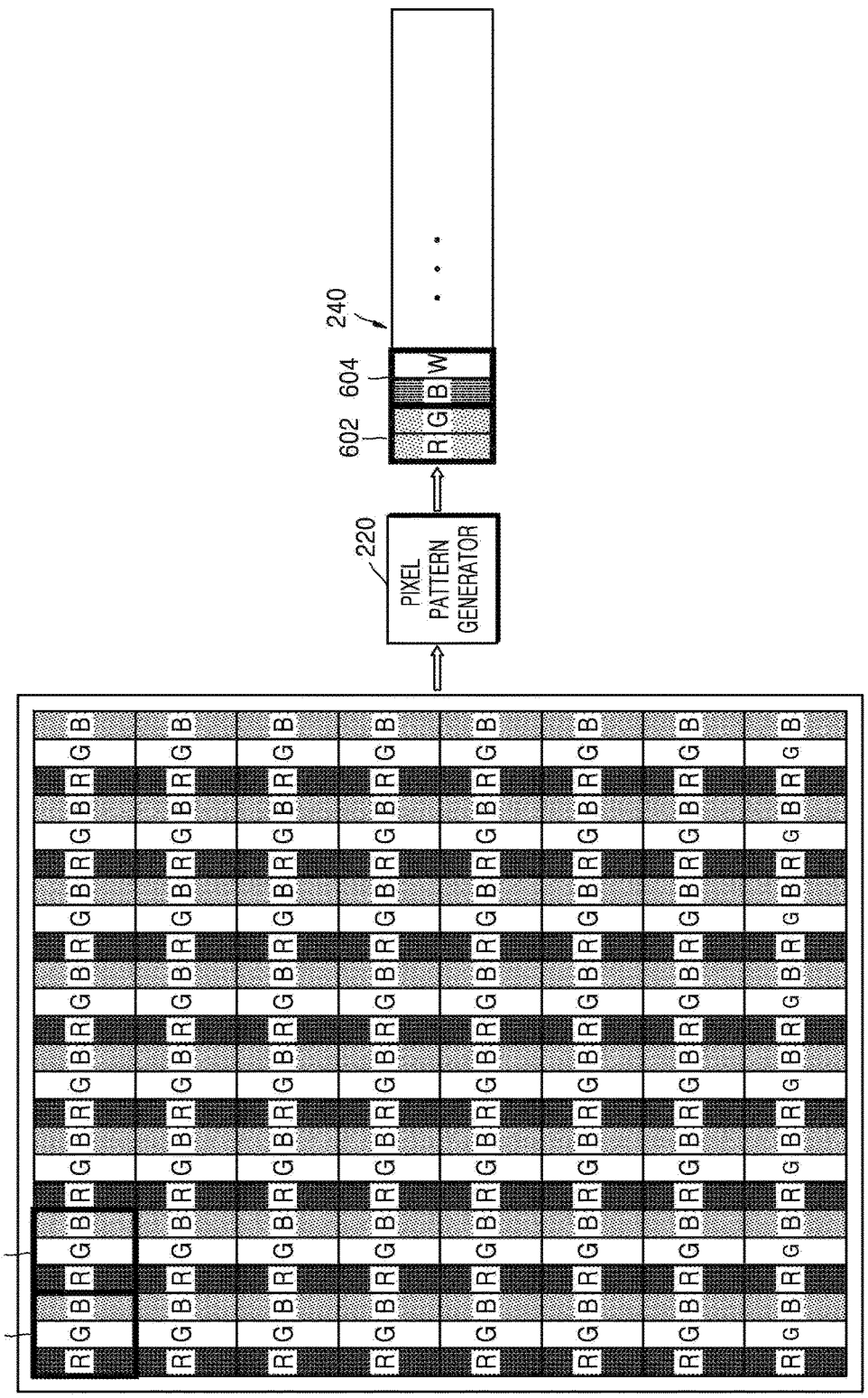
FIG. 6 is a view for illustrating a process of generating a pixel pattern via a pixel pattern generator of FIG. 3, according to another example.

FIG. 6 is a view for illustrating another example of the pixel pattern generator 220 of FIG. 3 generating a pixel pattern.

Referring to FIG. 6, one frame of a rendered image is illustrated as pixels 601 and 603 formed of RGB sub-pixels. When the display device 500 has the R/G and B/W patterns as illustrated in FIG. 4D, the pixel pattern generator 220 converts the first pixel 601 of the rendered image into a sub-pixel 602. The second pixel 603 is converted into a sub-pixel 604. The pixel patterns in which converted sub-pixels R/G and B/W are repeated are stored in the layout buffer 240. When a final pixel of the rendered image is converted into the sub-pixel B/W and stored in the layout buffer 240, pixel values stored in the layout buffer 240 are output into the frame buffer 250.

Figure 7:
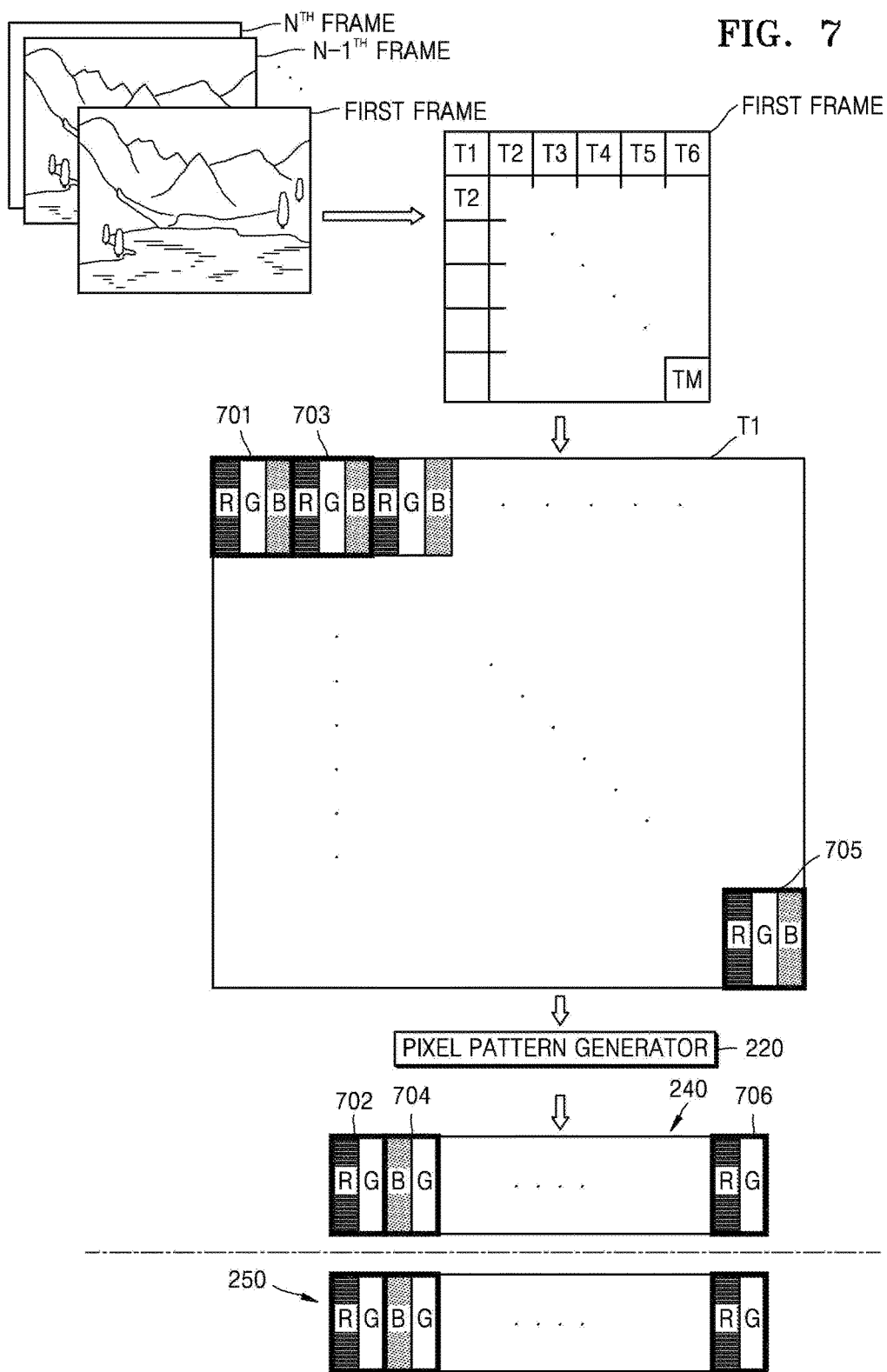
FIG. 7 is a view for illustrating a process of generating a pixel pattern via a pixel pattern generator of FIG. 3, according to another example.

FIG. 7 is a view for illustrating another example of the pixel pattern generator 220 illustrated in FIG. 3 generating a pixel pattern.

Referring to FIG. 7, a plurality of frames that are rendered, illustrated as a first frame through an $N^{th}$ frames, are sequentially input and tile-based rendering is performed with respect to the first frame. In the example of FIG. 7, rendering with respect to first through $M^{th}$ tiles (T1 through TM) generated by uniformly dividing the first frame is performed. In this example, a pixel pattern with respect to the rendered first tile T1 includes various sub-pixels, such as sub-pixels R/G/B 701, 703, and 705.

When the pixel pattern of the display device is RG/BG, the pixel pattern generator 220 generates pixel patterns 702 through 706 with respect to the first tile M1 and stores the generated pixel patterns 702 through 706 in the layout buffer 240. For example, the pixel patterns are generated based on a coordinate value of a start pixel with respect to each tile. The pixel pattern generator 220 generates pixel patterns with respect to all tiles T1 through TM and stores the generated pixel patterns in the layout buffer 240. After the pixel patterns with respect to all tiles T1 through TM are generated, only then does the rendering controller 210 output a pixel pattern value of the first frame, stored in the layout buffer 240, in the frame buffer 250. As discussed, such an approach potentially minimizes memory utilization.

Meanwhile, when the rendering result is not directly drawn on the screen and is used in another frame, that is, when the rendering result is re-used as a texture image of another frame, the rendering controller 210 writes the rendering result directly to the frame buffer 250 without also writing the rendering result to the layout buffer 240.

Figure 8:
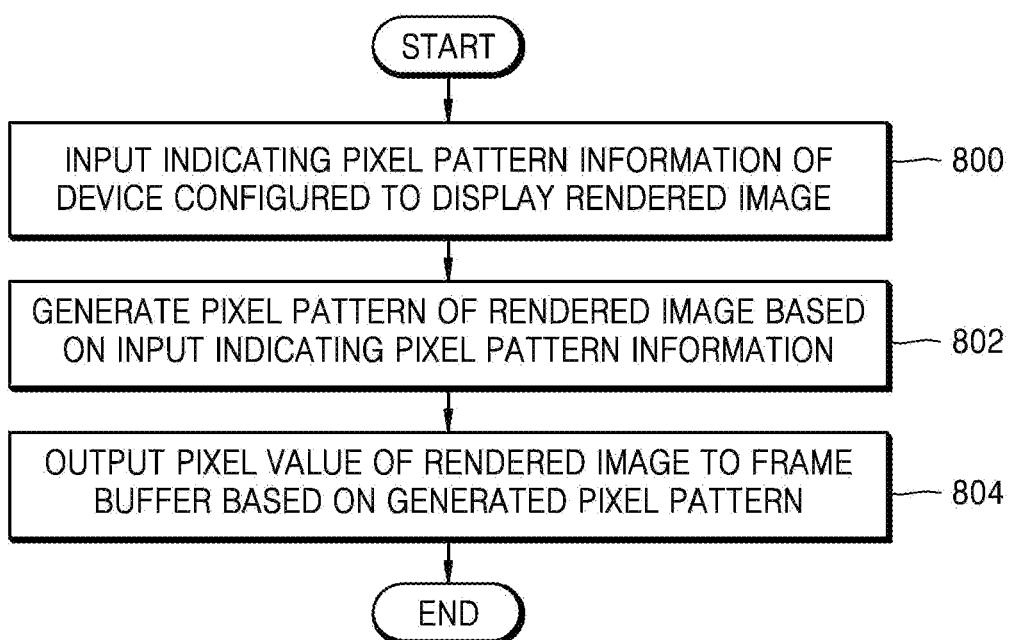
FIG. 8 is a flowchart of a rendering method according to another example.

FIG. 8 is a flowchart for describing a rendering method according to another example.

Referring to FIG. 8, in operation S800, the method receives input indicating pixel pattern information of device configured to display a rendered image. For example, pixel pattern information of a device via which a rendered image is to be displayed is input. In such an example, the device via which the rendered image is to be displayed is a PENTILE display device including R/G and B/G, or R/G and B/W. However, the device is not limited thereto and other examples include all display devices including pixel patterns of rendered images. For example, other example devices include appropriate display devices realized as sub-pixels different from the RGB sub-pixels.

In operation S802, the method generates a pixel pattern of a rendered image based on input indicating pixel pattern information. For example, a pixel pattern of the rendered image is generated corresponding to the input pixel pattern information. The pixel pattern of the rendered image is changed into the pixel pattern of the display device to generate sub-pixels. Here, the method of generating sub-pixels includes various technologies for generating sub-pixels.

In operation S804, the method outputs a pixel value of the rendered image to the frame buffer based on the generated pixel pattern. For example, a pixel value of the rendered image is output in the frame buffer based on the generated pixel pattern.

The image display apparatus described herein may be implemented using a liquid crystal display (LCD), a light-emitting diode (LED) display, a plasma display panel (PDP), a screen, a terminal, or any other type of display known to one of ordinary skill in the art. A screen may be a physical structure that includes one or more hardware components that provide the ability to render a user interface and receive user input. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display. A single physical screen may include multiple displays that are managed as separate logical displays permitting different content to be displayed on separate displays even though they are part of the same physical screen.

The apparatuses, units, modules, devices, and other components illustrated in FIGS. 1-8 that perform the operations described herein with respect to FIGS. 1-8 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described herein with respect to FIGS. 1-8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rendering method comprising:
   rendering an input image, the rendered input image including color information and position information corresponding to a full set of subpixel values for each pixel of the rendered input image, the full set of subpixel values corresponding to all possible subpixel components included in a display device;
   receiving an input comprising pixel pattern information of the display device configured to display a rendered image, the pixel pattern information including information related to only subpixel values corresponding to subpixels included in each pixel of the display device, the subpixel values being a subset of the full set of subpixel values;
   generating a pixel pattern of the rendered image using the received pixel pattern information of the display device based on a subpixel pattern of the display device, the subpixel pattern including color information and position information of each of the subpixels of the display device, the generating the pixel pattern of the rendered image including converting the color information and position information corresponding to the full set of subpixel values for each pixel of the rendered input image into color information and position information corresponding to the subset of pixel values of the full set of subpixel values included in each pixel of the display device;
   outputting a plurality of pixel values of the rendered image into a frame buffer using the generated pixel pattern;
   receiving an input comprising image property information indicating whether a frame corresponding to the rendered image is a texture frame for rendering of another frame; and
   in response to the image property information indicating that the frame corresponding to the rendered image is the texture frame for the rendering of another frame, restoring an initial pixel pattern of the rendered image by using the pixel pattern.

2. The method of claim 1, further comprising:
   storing pixel values corresponding to at least one tile of the rendered image as the pixel values corresponding to the generated pixel pattern; and
   outputting the pixel values corresponding to the generated pixel pattern into the frame buffer.

3. The method of claim 2, wherein the generated pixel pattern is based on a start coordinate value of the at least one tile.

4. The method of claim 1, further comprising:
   outputting a bypass signal to a display controller of the display device.

5. The method of claim 1, wherein the display device is a PENTILE-based display device.

6. The method of claim 1, wherein the subpixel pattern includes size information of each of the subpixels of the display device.

7. A non-transitory computer readable storage medium storing computer readable instructions for causing at least one processor to perform the method of claim 1.

8. A rendering method comprising:
   rendering an input image including a plurality of tiles, the rendered input image including color information and position information corresponding to a full set of subpixel values for each pixel of the rendered input image, the full set of subpixel values corresponding to all possible subpixel components included in a display device;
   receiving at least one tile corresponding to an arbitrary frame rendered using the plurality of tiles;
   converting a first pixel pattern corresponding to the at least one tile into a second pixel pattern corresponding to pixel pattern information of the display device configured to display the rendered arbitrary frame, the first pixel pattern including color information and position information corresponding to a full set of subpixel values associated with each pixel of the input image, the second pixel pattern including a subpixel pattern including information related to only subpixel values corresponding to subpixels included in each pixel of the display device, the subpixel values being a subset of pixel values of the full set of subpixel values associated with each pixel of the input image, the subpixel pattern including color information and position information of each of the subpixels of the display device;
   outputting a plurality of pixel values corresponding to the at least one tile according to the converted second pixel pattern into a frame buffer;
   receiving an input comprising image property information indicating whether a frame corresponding to the rendered image is a texture frame for rendering of another frame; and
   in response to the image property information indicating that the frame corresponding to the rendered image is the texture frame for the rendering of another frame, restoring the first pixel pattern of the rendered image by using the second pixel pattern.

9. The method of claim 8, further comprising:
   storing pixel values corresponding to the plurality of tiles corresponding to the arbitrary frame using the converted second pixel pattern, wherein the pixel values stored corresponding to the converted second pixel pattern are output into the frame buffer.

10. The method of claim 9, wherein the second pixel pattern is generated using a start coordinate value of the at least one tile.

11. The method of claim 9, wherein in response to the plurality of tiles being completely converted into the second pixel pattern, the pixel values stored corresponding to the arbitrary frame are output into the frame buffer.

12. A rendering apparatus comprising:
   a memory having computer readable instructions stored thereon; and at least one processor configured to execute the computer readable instructions to, render an input image, the rendered input image including color information and position information corresponding to a full set of subpixel values for each pixel of the rendered input image, the full set of subpixel values corresponding to all possible subpixel components included in a display device, receive an input comprising pixel pattern information of the display device configured to display a rendered image, the pixel pattern information including information related to only the subpixel values corresponding to subpixels included in each pixel of the display device, the subpixel values being a subset of the full set of subpixel values, generate a pixel pattern of the rendered image using the received pixel pattern information of the display device based on a subpixel pattern of the display device, the subpixel pattern including color information and position information of each of the subpixels of the display device, the generating the pixel pattern of the rendered image including converting the color information and position information corresponding to the full set of subpixel values for each pixel of the rendered input image into color information and position information corresponding to the subset of the full set of subpixel values included in each pixel of the display device, output a plurality of pixel values of the rendered image into a frame buffer using the generated pixel pattern, receive image property information indicating whether a frame corresponding to the rendered image is a texture frame for rendering of another frame, and in response to the image property information indicating that the frame corresponding to rendered image is the texture frame for the rendering of another frame, restore an initial pixel pattern of the rendered image using the pixel pattern.

13. The apparatus of claim 12, further comprising:
a layout buffer configured to store pixel values corresponding to at least one tile of the rendered image as the pixel values corresponding to the generated pixel pattern, wherein the at least one processor is further configured to output the pixel values corresponding to the pixel pattern stored in the layout buffer into the frame buffer.

14. The apparatus of claim 13, wherein the generated pixel pattern is based on a start coordinate value of the at least one tile.

15. The apparatus of claim 12, wherein the at least one processor is further configured to:
output a bypass signal to a display controller of the display device.

16. An electronic device comprising:
a host processor;
a display device;
a graphic processor configured to render a three-dimensional model of an object using a control of the host processor; and a frame buffer configured to store an image rendered by the graphic processor and to output the stored image using the display device, wherein the graphic processor is configured to, render an input image, the rendered input image including color information and position information corresponding to a full set of subpixel values for each pixel of the rendered input image, the full set of subpixel values corresponding to all possible subpixel components included in a display device, receive, from the host processor, an input comprising pixel pattern information of the display device, the pixel pattern information including information related to only subpixel values corresponding to subpixels included in each pixel of the display device, the subpixel values being a subset of the full set of subpixel values, generate a pixel pattern of the rendered image using the received pixel pattern information of the display device based on a subpixel pattern of the display device, the subpixel pattern including color information and position information of each of the subpixels of the display device, the generating the pixel pattern of the rendered image including converting the color information and position information corresponding to the full set of subpixel values for each pixel of the rendered input image into color information and position information corresponding to the subset of the full set of subpixel values included in each pixel of the display device, output a plurality of pixel values of the rendered image into the frame buffer using the generated pixel pattern, determine image property information indicating whether a frame corresponding to the rendered image is a texture frame for rendering of another frame in the graphic processor, and in response to the image property information indicating that the frame corresponding to the rendered image is the texture frame for the rendering of another frame, restore an initial pixel pattern of the rendered image using the pixel pattern.

17. The device of claim 16, wherein the graphic processor is further configured to:
store pixel values corresponding to at least one tile of the rendered image as the pixel values corresponding to the generated pixel pattern; and
output the stored pixel values into the frame buffer.

18. The device of claim 16, wherein the graphic processor is further configured to:
output a bypass signal to a display controller configured to control the display device.

19. The device of claim 16, wherein the graphic processor is further configured to restore the initial pixel pattern of the rendered image using tile-based rendering.

20. The device of claim 16, wherein the display device is a PENTILE-based display device.

* * * * *